(12) United States Patent
Park

(10) Patent No.: US 12,066,866 B2
(45) Date of Patent: Aug. 20, 2024

(54) FLEXIBLE DISPLAY DEVICE AND CONTROL METHOD THEREFOR

(71) Applicant: LG ELECTRONICS INC., Seoul (KR)

(72) Inventor: Juhyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 17/629,101

(22) PCT Filed: Jul. 23, 2019

(86) PCT No.: PCT/KR2019/009113
§ 371 (c)(1),
(2) Date: Jan. 21, 2022

(87) PCT Pub. No.: WO2021/015330
PCT Pub. Date: Jan. 28, 2021

(65) Prior Publication Data
US 2022/0291718 A1   Sep. 15, 2022

(51) Int. Cl.
*G06F 1/16* (2006.01)
(52) U.S. Cl.
CPC .................. *G06F 1/1652* (2013.01)
(58) Field of Classification Search
CPC .................................................... G06F 1/1652
See application file for complete search history.

(56) References Cited

U.S. PATENT DOCUMENTS

| | | | |
|---|---|---|---|
| 8,174,628 B2* | 5/2012 | Matsushita | G06F 1/1647 |
| | | | 348/836 |
| 8,711,566 B2* | 4/2014 | O'Brien | G06F 1/1652 |
| | | | 361/724 |
| 9,019,313 B2* | 4/2015 | Kwack | G06F 1/1652 |
| | | | 359/461 |
| 9,258,396 B2* | 2/2016 | Hwang | G06F 1/1652 |
| 10,420,227 B2* | 9/2019 | Lee | H05K 5/0221 |
| 10,652,376 B2* | 5/2020 | Yu | H04M 1/0216 |
| 11,348,201 B2* | 5/2022 | Jeong | G06F 3/04883 |

(Continued)

FOREIGN PATENT DOCUMENTS

| KR | 10-2016-0097033 A | 8/2016 |
|---|---|---|
| KR | 10-2017-0010953 A | 2/2017 |

(Continued)

*Primary Examiner* — Adrian S Wilson
(74) *Attorney, Agent, or Firm* — Birch, Stewart, Kolasch & Birch, LLP

(57) ABSTRACT

The present invention relates to a flexible display device and a control method therefor. The flexible display device comprises: a body part having a polygonal column shape; a flexible display unit which is configured to be inserted into the body part or withdrawn from the body part, while being deformed by an external force; a rotary member which is rotatably installed inside the body part and makes the flexible display unit become rolled or unrolled along the outer surface; a conductive member which is installed and fixed to the bottom surface portion inside the body part and contacts the flexible display unit to apply a touch input; and a control unit which sets an externally exposed region of the flexible display unit as an active region on the basis of the touch input applied to the flexible display unit.

18 Claims, 11 Drawing Sheets

(a)

(b)

(56) References Cited

U.S. PATENT DOCUMENTS

| | | | |
|---|---|---|---|
| 11,531,375 B2* | 12/2022 | Cho | H04M 1/0268 |
| 2010/0033435 A1* | 2/2010 | Huitema | G09F 9/301 |
| | | | 345/173 |
| 2010/0053081 A1* | 3/2010 | Jee | G06F 1/1686 |
| | | | 345/157 |
| 2013/0127917 A1* | 5/2013 | Kwack | G06F 1/1652 |
| | | | 345/660 |
| 2014/0194165 A1* | 7/2014 | Hwang | G06F 3/147 |
| | | | 455/566 |
| 2016/0139633 A1* | 5/2016 | Lee | G06F 1/1652 |
| | | | 345/33 |
| 2017/0023978 A1* | 1/2017 | Cho | H04M 1/0268 |
| 2017/0140504 A1* | 5/2017 | Jeong | G06F 1/1677 |
| 2018/0376603 A1* | 12/2018 | Lee | H04M 1/0268 |
| 2019/0155476 A1* | 5/2019 | Kim | G09G 3/2092 |
| 2019/0227599 A1* | 7/2019 | Kwak | G09G 5/003 |
| 2019/0364676 A1* | 11/2019 | Lee | H05K 5/0017 |
| 2019/0369670 A1* | 12/2019 | Cho | G06F 1/1652 |

FOREIGN PATENT DOCUMENTS

| | | |
|---|---|---|
| KR | 10-1860880 B1 | 5/2018 |
| KR | 10-2019-0079241 A | 7/2019 |
| KR | 10-2019-0080516 A | 7/2019 |

* cited by examiner (a)

(b)

FLEXIBLE DISPLAY DEVICE AND CONTROL METHOD THEREFOR

CROSS REFERENCE TO RELATED APPLICATIONS

This application is the National Phase of PCT/KR2019/009113 filed on Jul. 23, 2019, which is hereby expressly incorporated by reference into the present application.

TECHNICAL FIELD

The present disclosure relates to a flexible display device having a flexible display deformable by external force, and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

Such mobile terminals are evolving into various types of designs and efforts are being made to develop more novel types of mobile terminals in order to meet the needs of users who desire newer and more various designs. Here, the novel types include structural changes and improvements for the users to use the mobile terminals more conveniently.

As one of such structural changes and improvements, mobile terminals in which at least a portion of a display unit can be bent or curved are attracting attention. In particular, as a flexible display capable of being bent has been developed, various studies have been made to apply the flexible display to a mobile terminal.

In the case of a mobile terminal having a flexible display unit, since the flexible display is accommodated inside a body part and is not exposed to outside or has a structure that can be exposed to the outside, it is necessary to vary a size of a display region that can be utilized by a user.

Accordingly, a structure in which a flexible display can be smoothly rolled on or unrolled from a body part is required and also a manipulation method for outputting a screen on an exposed region or activating such exposed region as a touch-detection region in an exposed state where at least a portion of the flexible display is unrolled, is needed.

DISCLOSURE OF INVENTION

Technical Problem

The present disclosure describes a structure of a flexible display device that is capable of improving convenience and portability of a user by virtue of a structure, in which a flexible display unit can be accommodated in or drawn out of a body part, and capable of setting an externally-exposed region as an active region according to a change in the externally-exposed region of the flexible display unit.

The present disclosure also describes a flexible display device, in which an externally-exposed region of a flexible display unit can be changed in response to a user rolling or unrolling the flexible display unit into or out of a body part, and the changed externally-exposed region can be effectively activated, and a method for controlling the same.

Solution to Problem

According to those and other advantages of the subject matter described in this application, a flexible display device may include a body part having a polygonal column shape, a flexible display unit configured to be deformed by external force so as to be inserted into or drawn out of the body part, a rotary member rotatably installed inside the body part and configured to roll or unroll the flexible display unit along an outer surface thereof, conductive members fixed to a bottom surface inside the body part and configured to apply touch inputs in response to being in contact with the flexible display unit, and a controller configured to set an externally-exposed region of the flexible display unit to an active region based on the touch input applied to the flexible display unit.

In one implementation, the flexible display unit may be unrolled from the rotary member to increase the externally-exposed region and may be rolled on the rotary member to decrease the externally-exposed region.

In one implementation, the controller may set the externally-exposed region to an active region and a non-exposed region of the flexible display unit located inside the body part to an inactive region. The controller may set an operation region of the flexible display unit based on the touch inputs. In addition, the flexible display unit may be deformed to be rollable on the rotary member while being inserted into the body part, and may be deformed to be unrollable from the rotary member while being drawn out of the body part.

In one implementation, the flexible display unit may include a touch sensing layer having a plurality of touch channels arranged at predetermined intervals to receive touch inputs, and the touch channels may transmit signals (electrical signals), respectively, for setting the active region to the controller, in response to being in contact with the conductive members according to a change in the exposed region of the flexible display unit.

Also, the controller may set the non-exposed region of the flexible display unit to the inactive region, based on position information related to the touch channels in contact with the conductive members.

In one implementation, the controller may set the non-exposed region of the flexible display unit located inside the body part to the inactive region, based on the touch channels in contact with the conductive members. Also, the controller may control screen information to be displayed on the active region.

In one implementation, the controller may control a touch input to be detected on the active region. Here, the conductive members may be disposed in a predetermined shape on an inner surface of the body part, along an extending direction of the body part.

In one implementation, the conductive member may be made of any one of conductive rubber and metal.

In one implementation, the conductive members may be arranged in parallel at a predetermined interval, and may be arranged in a concave-convex shape.

In one implementation, the body part may be formed in a polygonal column shape with both ends open, and may include a main cover member having a polygonal column shape with both ends open and defining an inner storage space, and side cover members configured to cover the both ends of the main cover member.

In one implementation, the body part may include a first body and a second body disposed to face the first body, and the externally-exposed region of the flexible display unit may be changed as a distance between the first body and the second body changes according to an unrolled state of the flexible display unit.

In one implementation, the conductive members may be fixed to bottom surfaces inside the first body and the second body, respectively, to apply touch inputs when being in contact with the flexible display unit. The controller may set the externally-exposed region of the flexible display unit to the active region based on signals generated by the touch inputs.

In one implementation, the flexible display device may further include a rear plate coupled to a rear surface of the flexible display unit to be deformed together with the flexible display unit.

In one implementation, a front portion of the rear plate may be closely coupled to a rear portion of the flexible display unit, and one side of a rear portion of the rear plate may be rolled along the outer surface of the rotary member.

In one implementation, a first magnet may be disposed on an outer surface of the first body.

A second magnet may be disposed on an outer surface of the second body to face the first magnet. The first magnet and the second magnet may get adjacent to each other and interact with each other such that the first body and the second body are in close contact with each other, when an exposure area of the flexible display unit is minimized.

According to those and other advantages of the subject matter described in this application, a method for controlling a flexible display device may include a first step of setting an exposed region of a flexible display unit to an active region, the flexible display unit being deformed by external force to be drawn out of or inserted into the body part, a second step of setting the exposed region of the flexible display unit to a new active region by detecting a change in the active region, and a third step of setting a region of the flexible display unit inserted into the body part to an inactive region.

In one implementation, the first step may include setting by a controller an externally-exposed region of the flexible display unit to the active region based on touch inputs (input signals) generated in response to a contact between the flexible display unit and conductive members disposed inside the body part.

Advantageous Effects of Invention

Effects of the present disclosure that can be obtained through the solution will be described as follows.

In a flexible display device having the structure as described above, a flexible display unit can be rolled on a rotary member inside a body part or drawn out of the body part, which can more improve convenience and portability of a user. Also, an externally-exposed region of the flexible display unit can be driven as an active region for outputting screen information or receiving touch inputs.

The user can change the externally-exposed region of the flexible display unit and can effectively activate the changed exposed region of the flexible display unit by a method of transmitting electrical signals, which are generated in response to touch channels of the flexible display unit being in contact with conductive members, to a controller.

Figure 4:
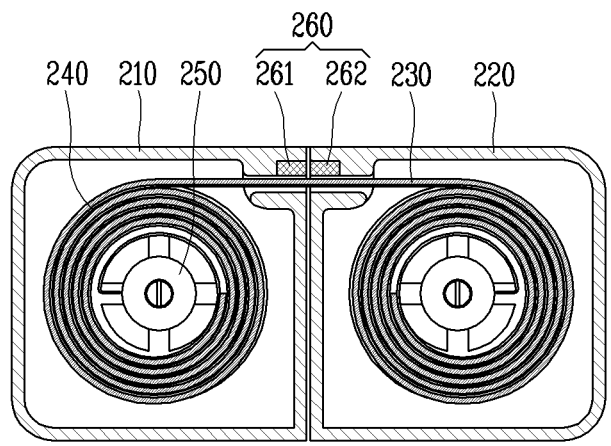
Figure 4:
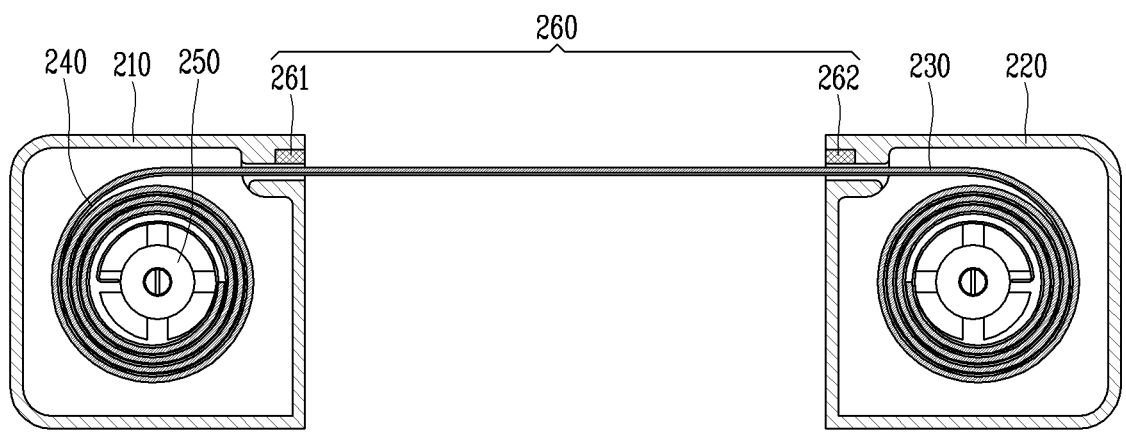

(a) of FIG. 4 is a cross-sectional view of the flexible display device in a first state.

(b) of FIG. 4 is a cross-sectional view of the flexible display device in a second state.

Figure 5A:
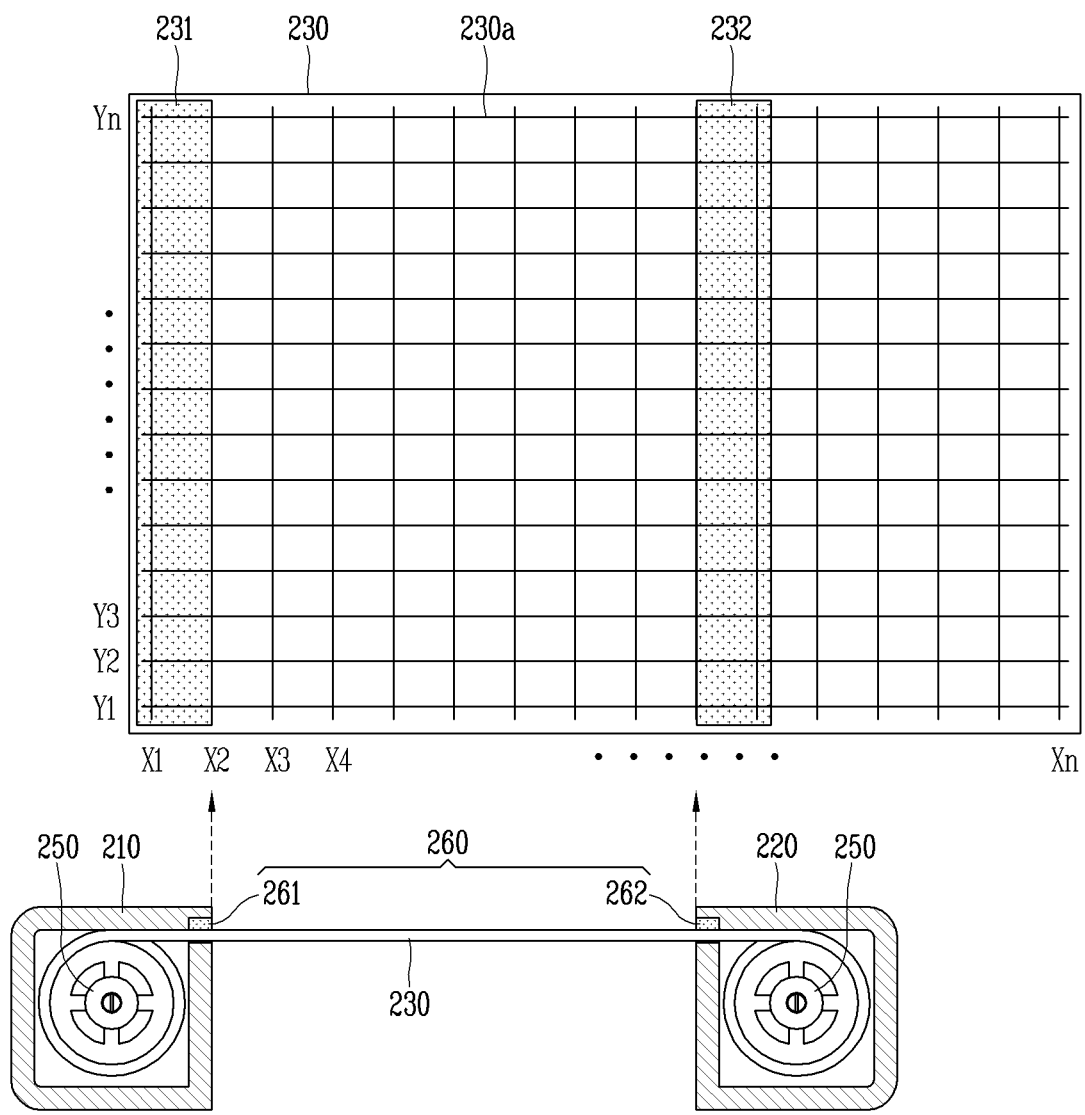
Figure 5B:
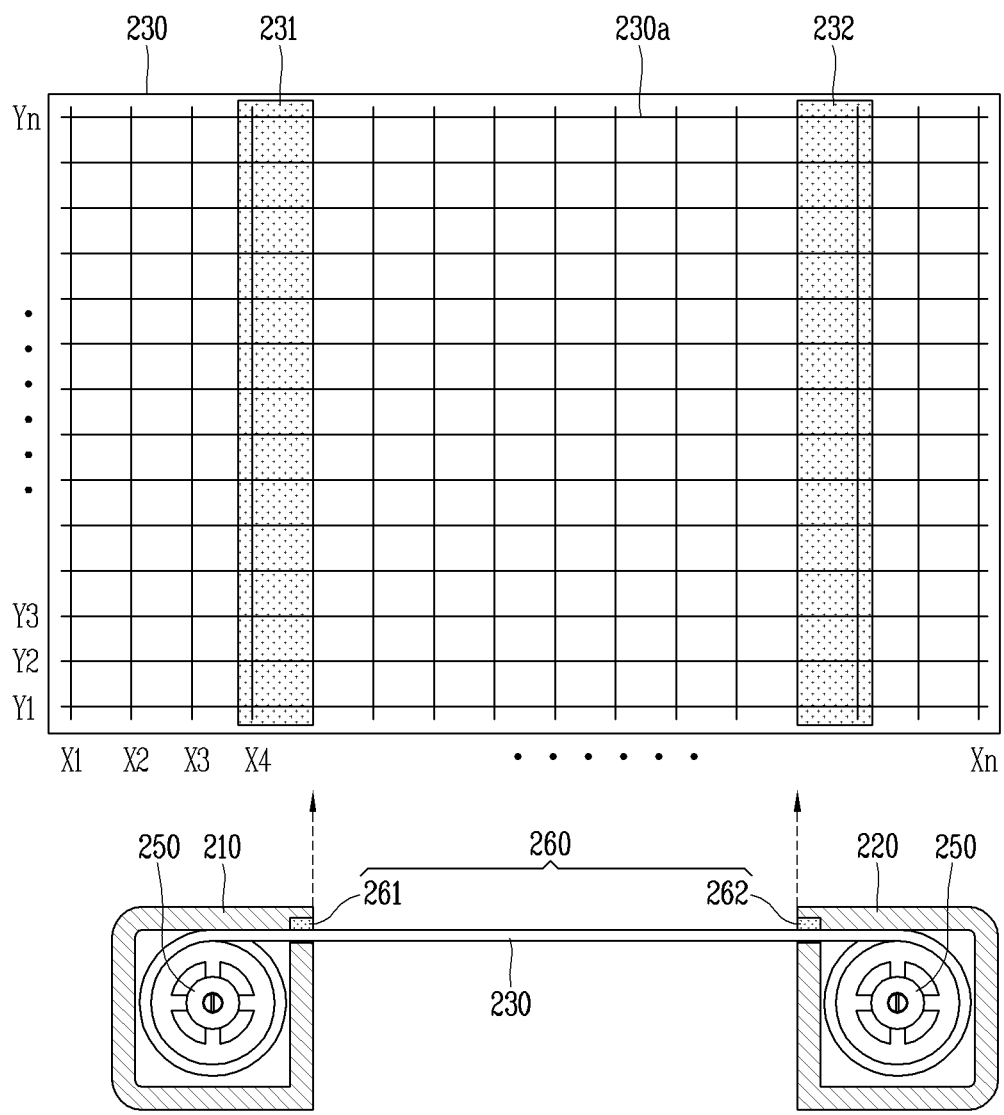

FIGS. 5A and 5B are conceptual views illustrating a state when a conductive member applies an input signal to the flexible display unit.

Figure 6A:
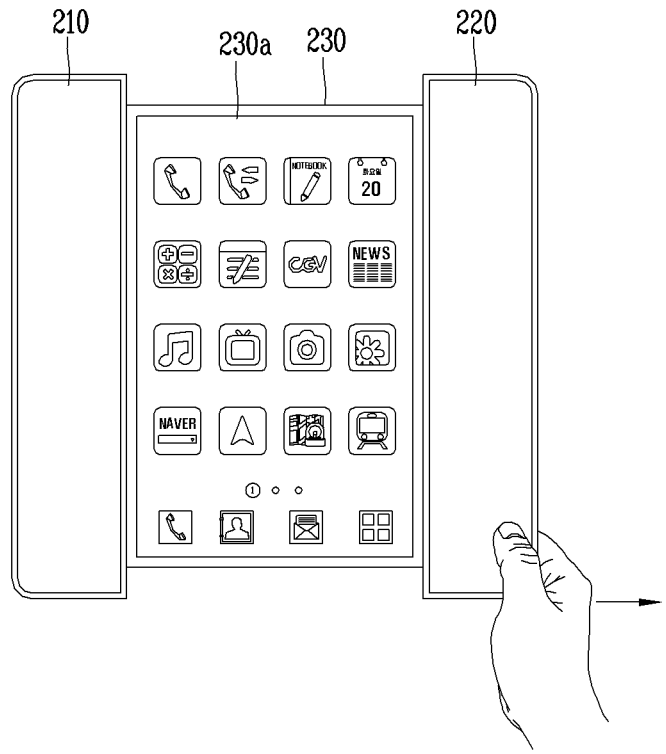
Figure 6B:
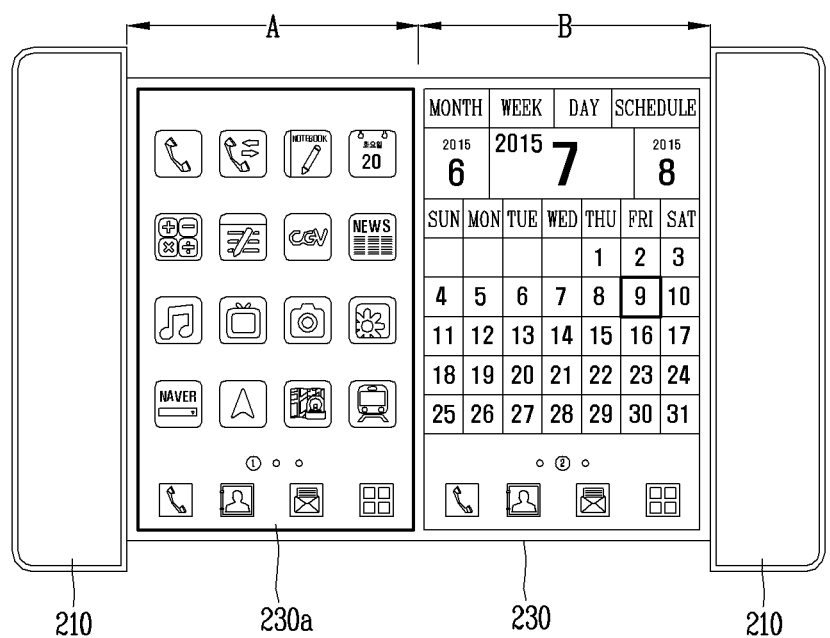

FIGS. 6A and 6B are conceptual views illustrating a state in which screen information is displayed on the flexible display unit exposed to outside.

Figure 7:
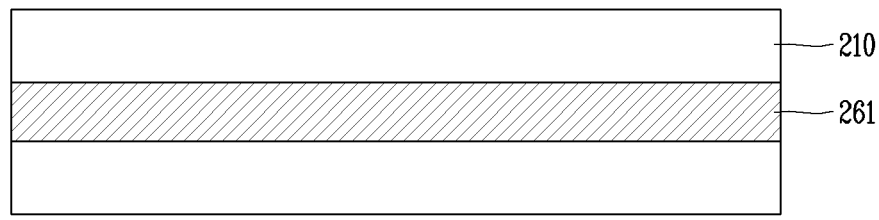
Figure 7:
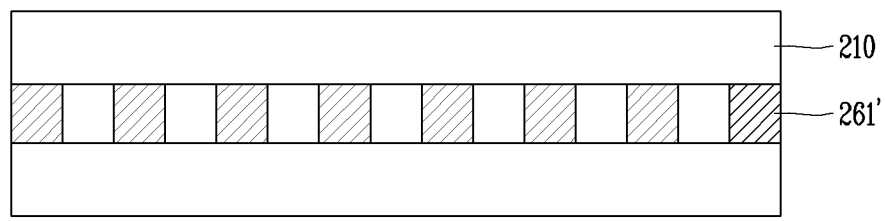

(a) and (b) of FIG. 7 is a conceptual view illustrating various shapes of the conductive member.

Figure 8:
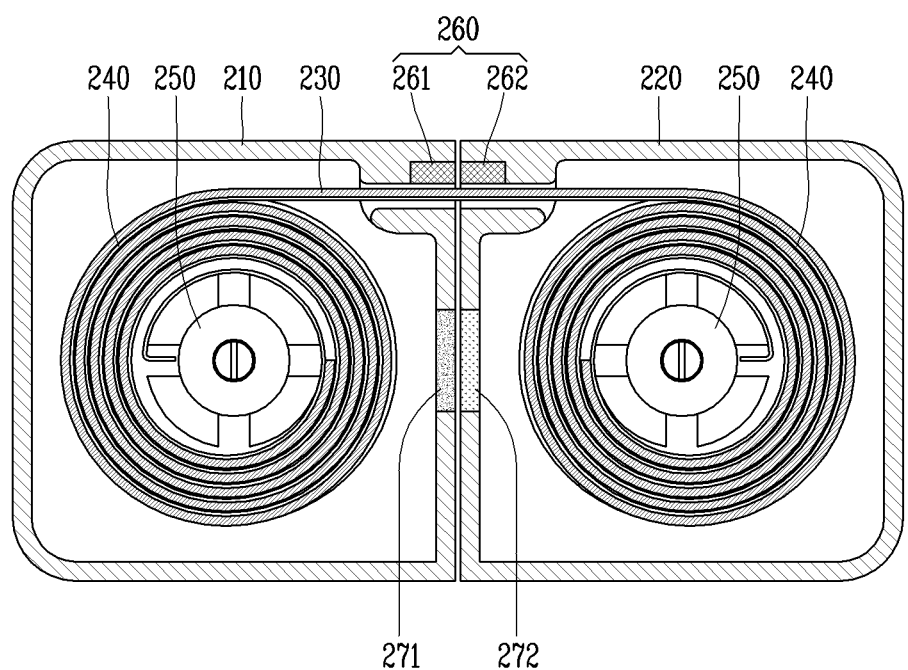

FIG. 8 is a cross-sectional view illustrating a flexible display device in accordance with another implementation.

Figure 9:
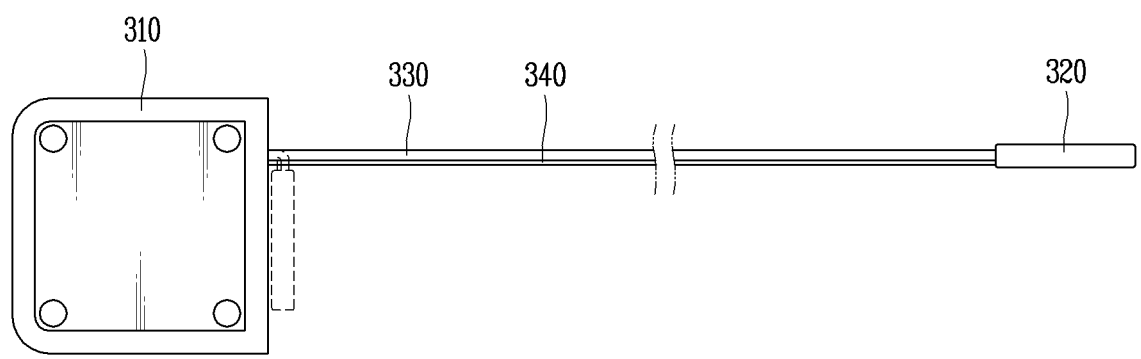

FIG. 9 is a lateral view illustrating a flexible display device 300 in accordance with still another implementation.

Figure 10A:
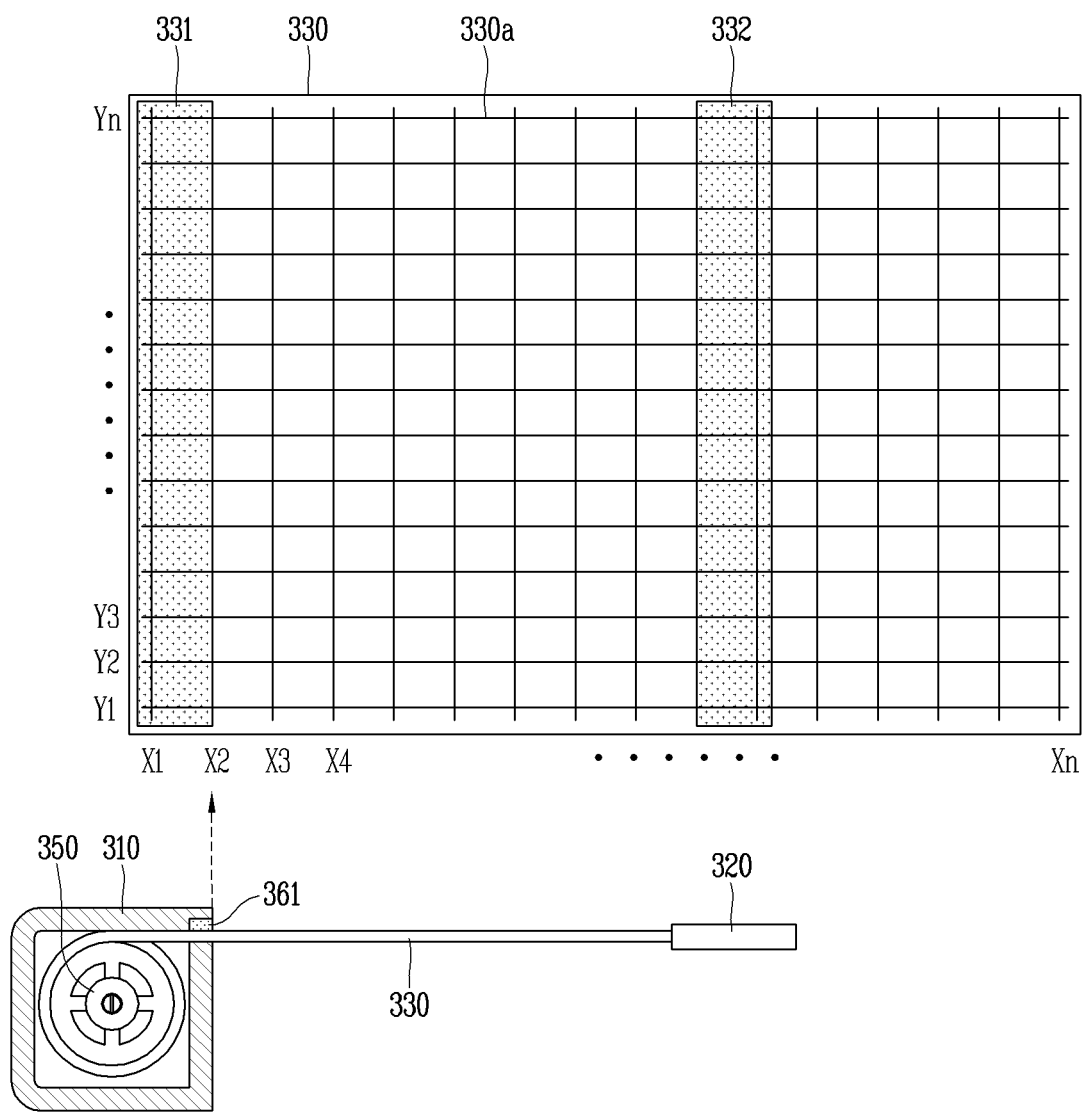
Figure 10B:
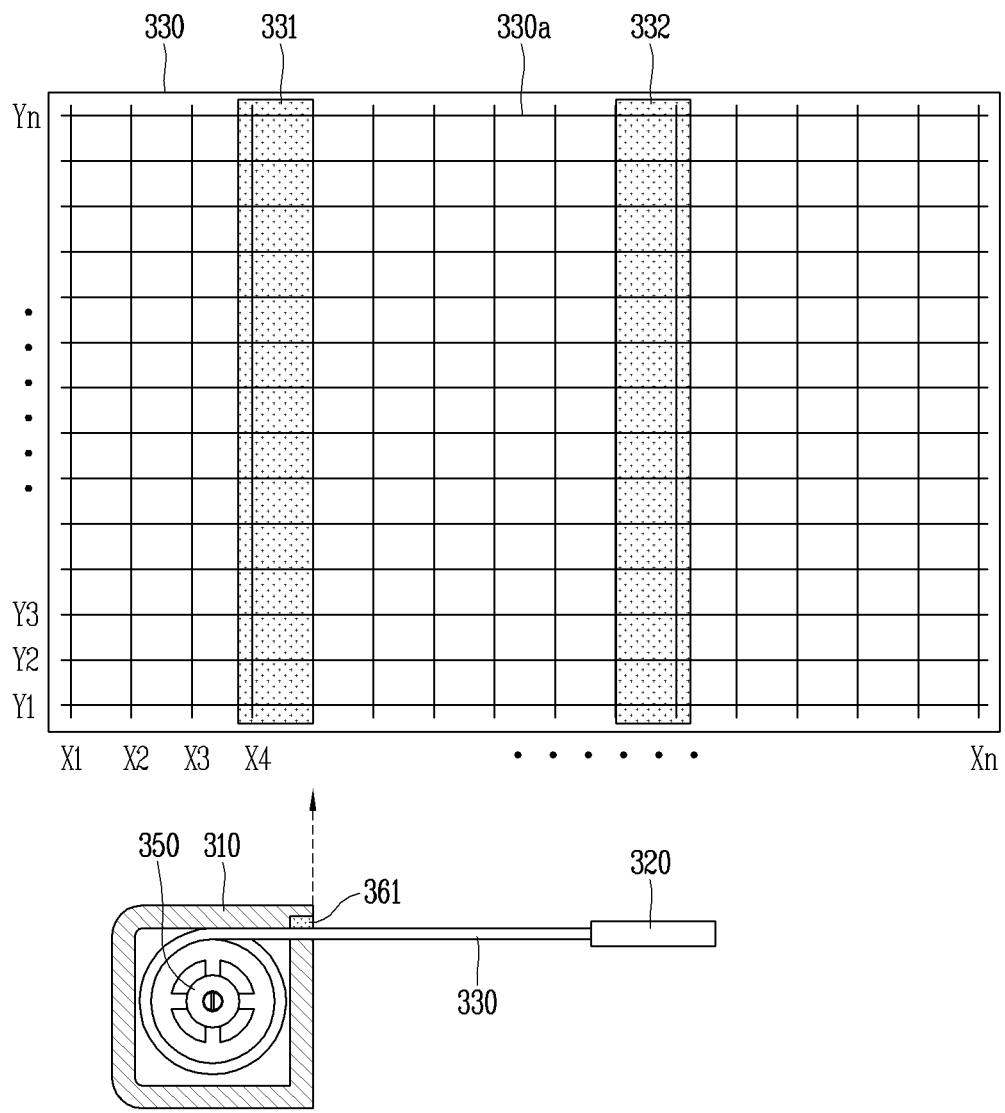

FIGS. 10A and 10B are conceptual views illustrating a state when a conductive member applies an input signal to a flexible display unit.

Figure 11:
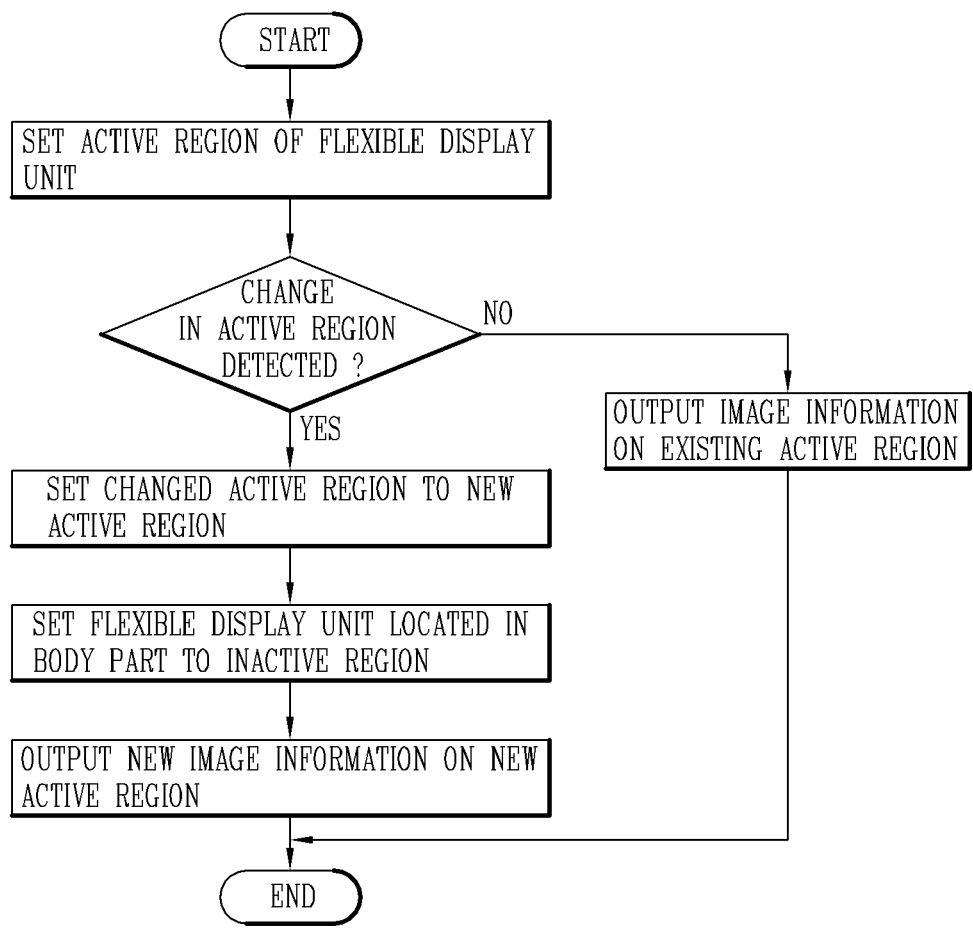

FIG. 11 is a flowchart illustrating a method for controlling a flexible display device in accordance with the present disclosure.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of terminals. Examples of such devices include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals. Hereinafter, for convenience of description, in this specification, a mobile terminal will be described as an example of a flexible display device.

Figure 1:
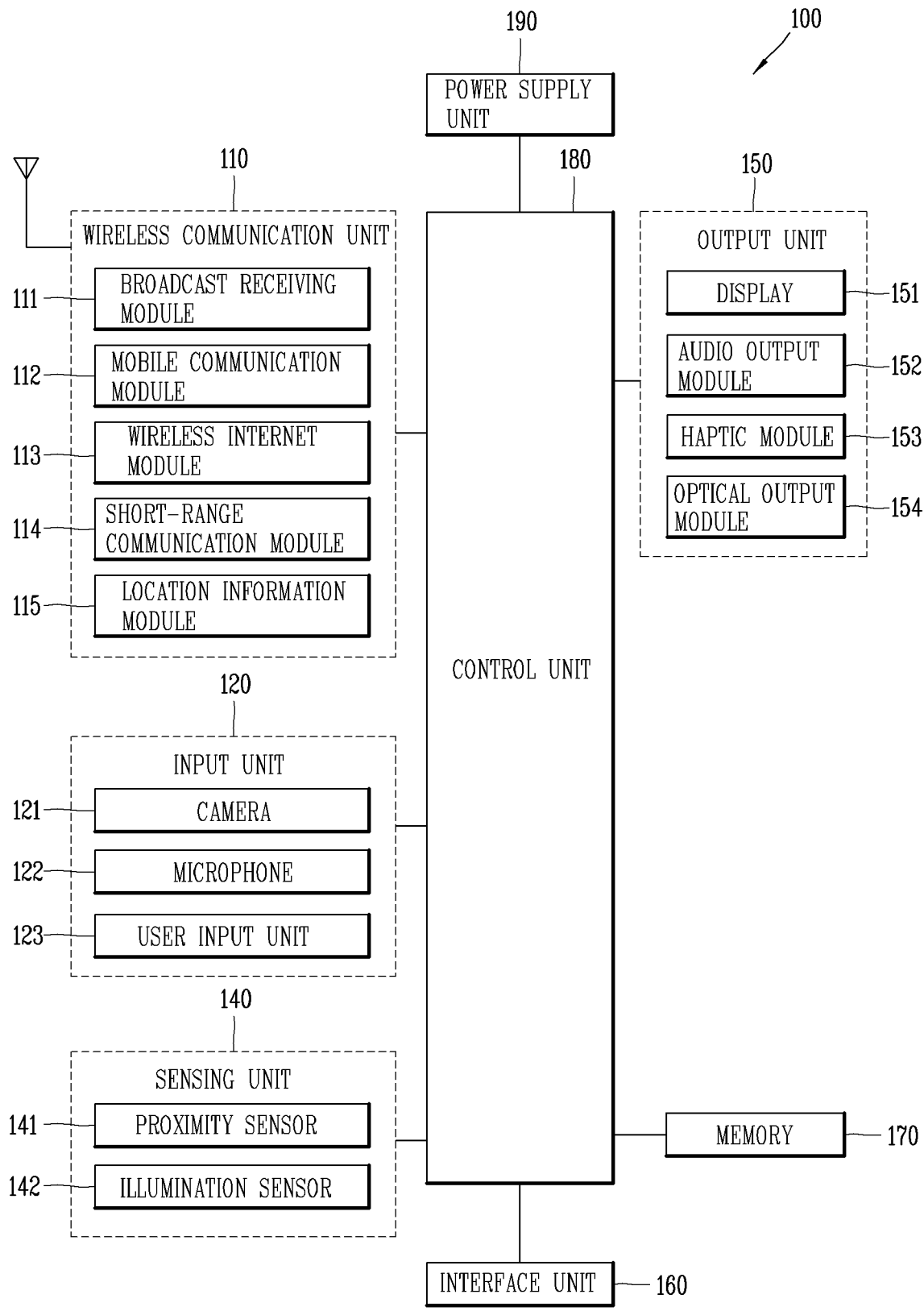
FIG. 1 is a block diagram of an example of a mobile terminal.

FIG. 1 is a block diagram illustrating a mobile terminal in accordance with the present disclosure.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions related to a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the control unit 180 to perform an operation (or function) for the mobile terminal 100.

The control unit 180 typically functions to control an overall operation of the mobile terminal 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1 to execute an application program that have been stored in the memory 170. In addition, the control unit 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. Two or more broadcast receiving modules may be utilized in the mobile terminal 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink PacketAccess), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink PacketAccess (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 is for inputting image or video information (or signal), audio information (or signal), data, or user input. The mobile terminal 100 may include one or a plurality of cameras 121 through which such image information can be obtained. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the control unit 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The control unit 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which area of the display 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller 180. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control operations relating to application programs and the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supply the appropriate power required for operating respective elements and components included in the mobile terminal 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

At least one antenna for wireless communication may be disposed on the terminal body. The antenna may be embedded in the terminal body or formed in the case. For example, an antenna which configures a part of the broadcast receiving module 111 (see FIG. 1) may be retractable into the terminal body. Alternatively, an antenna may be formed in a form of film to be attached onto an inner surface of a housing or a case including a conductive material may serve as an antenna.

The terminal body is provided with a power supply unit 190 (see FIG. 1) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
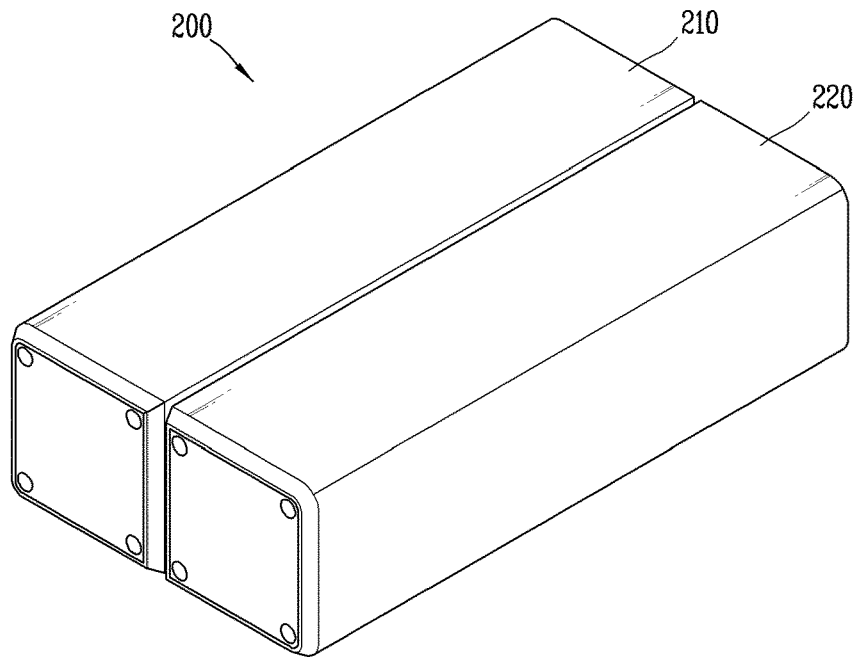
FIG. 2 is a perspective view of a flexible display device.
Figure 3:
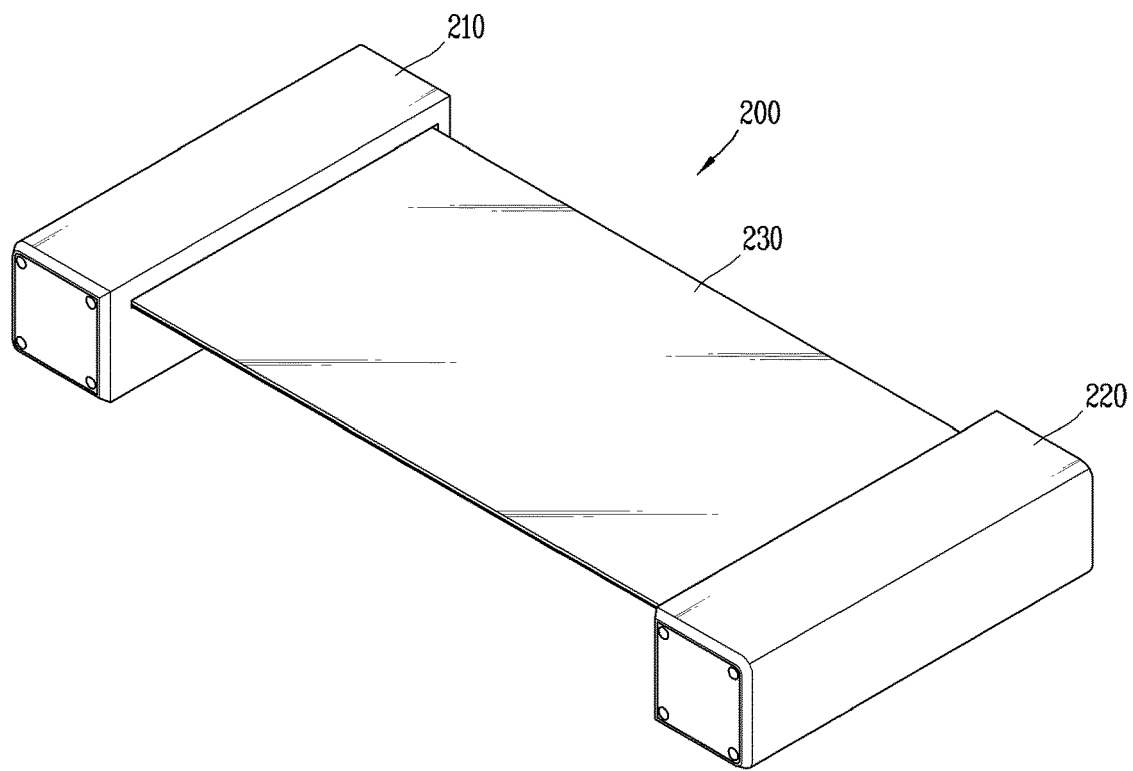
FIG. 3 is a perspective view illustrating a state in which a flexible display unit is unrolled from a body part.

FIG. 2 is a perspective view of a flexible display device 200, which is a perspective view illustrating a state in which a flexible display unit 230 is rolled on a body part 210, 220. FIG. 3 is a perspective view illustrating a state in which the flexible display unit 230 is unrolled from the body part 210, 220.

The flexible display device 200 may be understood as one type of the mobile terminal. In this specification, for convenience, a mobile terminal will be referred to as a flexible display device.

The flexible display device 200 may include a body part 210, 220 and a flexible display unit 230 that is deformable by external force. In addition, the flexible display device 200 may include rotary members 250 (see FIG. 4) that are rotatably installed inside the body part 210, 220, and a conductive member 260 (see FIG. 4) that is disposed on a bottom surface inside the body part 210, 220 to apply a touch input in contact with the flexible display unit 230.

The flexible display device 200 may implement a first state in which the flexible display unit 230 is rolled in the body part 210, 220, and a second state in which at least a portion of the flexible display unit 230 is unrolled from the body part 210.

The body part 210, 220 may have a polygonal column shape. The body part 210, 220 may have a cut surface in a polygonal shape. The body part 210, 220 may extend in one direction and define an inner storage space (not illustrated).

In addition, covers may be disposed on both sides of the body part 210, 220 to restrict exposure of the inner storage space of the body part 210, 220. Here, the covers (not illustrated) may be detachable such that electronic components (not illustrated) mounted in the body part 210, 220 can be drawn out or replaced.

For example, the body parts 210, 220 may include a main cover member (not illustrated) formed in a polygonal column shape with both ends open and having an inner storage space, and side cover members (not illustrated) covering the both ends of the main cover member (not illustrated).

Various electronic components (not illustrated) may be mounted in the storage space (not illustrated) defined inside the main cover member (not illustrated). For example, a circuit board, an identification module, a memory card, and the like which are all detachable may be installed in the main cover member.

In addition, at least one antenna (not illustrated) for wireless communication may be disposed inside the body part 210, 220 and the power supply unit 190 (refer to FIG. 1) for supplying power to the flexible display device 200 may also be disposed in the body part 210, 220. Here, the power supply unit 190 may refer to a battery 191 configured to be detachable from the body part 210, 220. The battery 191 may receive power through a power cable connected to the interface unit 160 and may also be configured to be wirelessly recharged by a wireless charger. The wireless recharging may be implemented by magnetic induction or electromagnetic resonance.

In addition, a flexible printed circuit board (not illustrated) may be disposed in the body part 210, 220 in a state of being connected to one end portion of the flexible display unit 230. The flexible printed circuit board (not illustrated) may be provided thereon with a driver semiconductor (Driver Integrated Circuit (IC), not illustrated) for driving the flexible display unit 230. The driver IC may be configured to apply a driving signal and data to a display panel as electrical signals (multi-high voltage level signals), such that text or image can be displayed on a screen.

The body part 210, 220 may be formed of metal. The flexible display unit 230 may be formed of synthetic resin through injection molding or may be formed of metal, for example, stainless steel (STS), aluminum (Al), titanium (Ti), or the like.

According to an implementation, the body part 210, 220 may include a first body 210 and a second body 220, and may also be configured as illustrated in FIG. 9 to be described later.

For example, as illustrated in FIGS. 2 and 3, both sides of the flexible display unit 230 may be fixed to the first body 210 and the second body 220, respectively, and an externally-exposed region of the flexible display unit 230 may change in response to the movement of the first body 210 and the second body 220.

In addition, in the flexible display device 200, the flexible display unit 230 may implement a first state, as illustrated in FIG. 2, in which the flexible display unit 230 is rolled into the first body 210 and the second body 220, and a second state, as illustrated in FIG. 3, in which at least a portion of the flexible display unit 230 is unrolled by being drawn out of the first body 210 and the second body 220.

The flexible display device 200 may display information processed using the flexible display unit 230 which is flexible to be deformable by external force.

Here, the deformation may mean at least one of curving, bending, folding, twisting, and rolling of a display module, and indicate a characteristic that the flexible display unit 230 is rolled in the first body 210 and the second body 220.

In this way, the deformable display module may be referred to as 'flexible display unit'. Here, the flexible display unit 230 may be configured as a typical flexible display, an electronic paper (e-paper), and a combination thereof.

The typical flexible display 230 may refer to a durable display that is lightweight and does not break easily by being fabricated on a thin, flexible substrate, such as paper, which is bent, curved, folded, twisted or rolled while maintaining characteristics of an existing flat panel display.

The electronic paper may be a display to which general ink characteristics are applied, and may be different from the existing flat panel display in view of using reflected light. The electronic paper may change information by using a twist ball or electrophoresis (electrophoresis) using a capsule.

The flexible display device 200 may implement a state in which the flexible display unit 230 has been deformed by external force (e.g., a state where the flexible display unit 230 has a finite radius of curvature and at least a portion is accommodated by being rolled in the first body 210 and the second body 220, namely, the first state, see FIG. 2), and a state in which the flexible display unit 230 is unrolled (e.g., a state where at least a portion of the flexible display unit 230 has an infinite radius of curvature, namely, the second state, see FIG. 3).

As illustrated in FIG. 3, the user can utilize the flexible display device 200 in the second state in which at least a portion of the flexible display unit 230 is unrolled to be exposed to outside, and may also keep or carry the flexible display device 200 in the state in which at least a portion of the flexible display unit 230 is rolled in the first body 210 and the second body 220. That is, the flexible display device (flexible display unit) can be used easily, and achieve portability and easy keeping.

Also, information displayed on the flexible display unit 230 may include output visual information. Such visual information may be realized by independently controlling an emission of unit pixels (sub-pixels) arranged in a matrix configuration. The unit pixel may denote an elementary unit for representing one color.

(a) of FIG. 4 is a cross-sectional view of the flexible display device 200 in the first state and (b) of FIG. 4 is a cross-sectional view of the flexible display device 200 in the second state.

The flexible display device 200 may implement the first state in which the first body 210 and the second body 220 are in close contact with each other and the flexible display unit 230 is rolled inside the first body 210 and the second body 220, and the second state in which the first body 210 and the second body 220 are located apart from each other and at least a portion of the flexible display unit 230 is unrolled from the first body 210 and the second body 220.

To this end, the flexible display device 200 may include rotary members 250 disposed in the first body 210 and the second body 220, respectively, for rolling or unrolling the flexible display unit 230.

The rotary members 250 may be formed in a cylindrical shape, and installed to be rotatable inside the first body 210 and the second body 220, and serve to roll or unroll the flexible display unit 230.

In this case, the flexible display device 200 may further include a rear plate 240 coupled to a rear surface of the flexible display unit 230 to allow smooth rolling and unrolling of the flexible display unit 230.

The rear plate 240 may serve to support the rear surface of the flexible display unit 230. The rear plate 240 may preferably be formed of a thin superelastic titanium alloy to minimize stress applied to the flexible display unit 230 when the flexible display unit 230 is deformed by being rolled or unrolled.

Here, the superelastic titanium alloy may refer to a material having a yield strain of about 2.0 to 2.5% (based on 0.3 mm thickness). The rear plate 240 may be made of not only the superelastic titanium alloy but also titanium-nickel (Ti—Ni), titanium-aluminum (Ti—Al), or thin-film stainless steel (STS).

At this time, a fixing groove (not illustrated) to which one end of the rear plate 240 in an extending direction of the rotary member 250 is fixed may be formed at an outer surface of the rotary member 250. One bent end portion of the rear plate 240 may be fixed after being inserted into the fixing groove (not illustrated).

In this case, as illustrated in FIG. 4, both ends of the rear plate 240 may be fixed to the fixing grooves (not illustrated) of the respective rotary members 250 disposed inside the first and second bodies 210 and 220.

Accordingly, when the rotary members 250 are rotated inside the first body 210 and the second body 220, the flexible display unit 230 and the rear plate 240 can be smoothly rolled along the outer surfaces of the respective rotary members 250 because the bent end portions (not illustrated) of the rear plate 240 are fixed. In the same manner, the flexible display unit 230 and the rear plate 240 may be unrolled from the rotary members 250.

That is, the flexible display unit 230 may be drawn out of the body part 210, 220 while being unrolled from the rotary members 250, such that an exposed region is increased. On the other hand, the flexible display unit 230 may be inserted into the body part 210, 220 while being rolled on the rotary members 250, such that the exposed region is decreased.

As illustrated in (a) of FIG. 4, the flexible display device 200 may have the first state in which the flexible display unit 230 has been rolled by the rotary members 250 accommodated in the first body 210 and the second body 220 while the first body 210 and the second body 220 are in close contact with each other. In addition, as illustrated in (b) of FIG. 4, the flexible display device 200 may have the second state in which at least a portion of the flexible display unit 230 has been exposed between the first body 210 and the second body 220 while the first body 210 and the second body 220 are spaced apart from each other.

At this time, the flexible display device 200 may include a conductive member 260 disposed on a bottom surface inside the body part 210, 220 to apply a touch input in contact with the flexible display unit 230, and a controller (not illustrated) configured to set an externally-exposed region of the flexible display unit 230 to an active region based on a signal generated by the touch input (or input signal) applied to the flexible display unit 230.

The conductive member 260 may be fixedly installed on bottom surfaces inside the first body 210 and the second body 220. Specifically, the conductive member 260 may include a first conductive member 261 disposed on the bottom surface inside the first body 210 and a second conductive member 262 disposed on the bottom surface inside the second body 220.

The first conductive member 261 and the second conductive member 262 may apply touch inputs by being brought into contact with one side of the flexible display unit 230. At this time, the controller (not illustrated) may set an externally-exposed region of the flexible display unit 230 to an active region based on a signal generated by the touch inputs (input signals) of the first conductive member 261 and the second conductive member 262.

FIGS. 5A and 5B are conceptual views illustrating a state when the conductive member 260 applies an input signal to the flexible display unit 230. FIGS. 6A and 6B are conceptual views illustrating a state in which screen information is displayed on the flexible display unit 230 exposed to outside.

The flexible display unit 230 may transmit to the controller (not illustrated) an input signal generated by interaction with the first conductive member 261 disposed on one end portion of an inner surface of the first body 210 and the second conductive member 262 disposed on one end portion of an inner surface of the second body 220.

The controller (not illustrated) may set the exposed region of the flexible display unit 230 to the active region based on the input signal received through the flexible display unit 230. The controller (not illustrated) may also set a non-exposed region of the flexible display unit 230 located inside the first body 210 and the second body 220 to an inactive region.

Specifically, when at least a portion of the flexible display unit 230 is deformed to be rollable on the rotary members 250 while being inserted into the first body 210 and the second body 220, the controller (not illustrated) may set an externally-exposed region of the flexible display unit 230 to an active region, based on touch inputs applied by the first conductive member 261 and the second conductive member 262.

That is, as illustrated in FIG. 6A, in the flexible display device 200, the controller may control the flexible display unit 230 having the flexible characteristic to display screen information processed.

Also, as illustrated in FIG. 6B, when the externally-exposed region of the flexible display unit 230 is increased, the controller may display split-screen information, which provides different types of information, through the active region of the flexible display unit 230.

As illustrated in FIGS. 5A and 5B, the flexible display unit 230 may include a touch sensing layer 230a that includes a plurality of touch channels X1 to Xn and Y1 to Yn arranged at predetermined intervals to receive touch inputs.

The touch sensing layer 230a may include a first sensing layer including first touch channels X1 to Xn extending in a first direction, and a second sensing layer including second touch channels Y1 to Yn extending in a second direction intersecting with the first direction.

The first and second touch channels X1 to Xn and Y1 to Yn may extend in the intersecting directions with each other and may be insulated from each other. The plurality of first touch channels X1 to Xn and the plurality of second touch channels Y1 to Yn may be arranged at preset intervals to detect touch inputs.

As illustrated in FIG. 5A, in a state in which one region of the flexible display unit 230 between the first body 210 and the second body 220 is exposed to outside, touch inputs may be applied to different regions of the touch sensing layer 230a by the first conductive member 261 disposed in the second body 210 and the second conductive member 262 disposed in the second body 220.

Specifically, the first conductive member 261 disposed in the first body 210 may apply a touch input signal of at least one first touch channel X1 to Xn, and may define a first touch recognition region 231.

In addition, the second conductive member 262 disposed in the second body 220 may apply a touch input signal of another first touch channel X1 to Xn located at a position different from a position in contact with the first conductive member 261, and define a second touch recognition region 232. In this case, the first touch recognition region 231 and the second touch recognition region 232 may be defined at different positions.

The controller (not illustrated) may set a region between the first touch recognition region 231 and the second touch recognition region 232 to an active region, to which a signal for outputting screen information is transmitted or a touch input is applied.

Also, the controller (not illustrated) may set another region of the flexible display unit 230 to an inactive region based on position information of touch channels in contact with the conductive members 261 and 262.

For example, the controller (not illustrated) may set the region between the first touch recognition region 231 and the second touch recognition region 232 to the active region, and may simultaneously set an outer region of the first touch recognition region 231 and the second touch recognition region 231 to an inactive region such that any signal is not generated for the corresponding region.

The controller (not illustrated) may set a region of the flexible display unit 230, which is located inside each body 210 and 220, to the inactive region based on position information of touch channels in contact with the conductive members 261 and 262.

Also, the flexible display device 200 may be deformed from the first state to the second state or from the second state to the first state according to a command input by a user or an application. In this case, the externally-exposed region of the flexible display unit 230 may vary depending on mutual movement of the first body 210 and the second body 220.

As illustrated in FIG. 5B, touch inputs may be applied to another regions of the touch sensing layer 230a by the first conductive member 261 disposed in the first body 210 and the second conductive member 262 disposed in the second body 220.

The first touch recognition region 231 and the second touch recognition region 232 of FIG. 5B may be defined at different positions from the first touch recognition region 231 and the second touch recognition region 232 of FIG. 5A.

Specifically, the first conductive member 261 disposed in the first body 210 may receive a touch input signal applied to at least one first touch channel X1 to Xn, and thus may define the first touch recognition region 231.

In addition, the second conductive member 262 disposed in the second body 220 may receive a touch input signal applied to another first touch channel X1 to Xn located at a position different from the position in contact with the first conductive member 261, and thus define the second touch recognition region 232.

Similarly, the controller (not illustrated) may set a region between the first touch recognition region 231 and the second touch recognition region 232 to the active region, to which a signal for outputting screen information is transmitted or a touch input is applied That is, the controller (not illustrated) may receive signals for setting the active region as the conductive members 261 and 262 are in contact with each other according to the change in the externally-exposed region of the flexible display unit 230, and set the externally-exposed region of the flexible display unit 230 to the active region of the flexible display unit 230 according to the received signals, so as to generate a control signal for changing information displayed on the flexible display unit 230 or controlling a function of the flexible display device 200, such as setting a touch detection region.

Also, the controller (not illustrated) may set another region of the flexible display unit 230 to the inactive region based on position information of touch channels in contact with the conductive members 261 and 262. For example, the controller (not illustrated) may set the region between the first touch recognition region 231 and the second touch recognition region 232 to the active region, and may simultaneously set an outer region of the first touch recognition region 231 and the second touch recognition region 231 to the inactive region such that any signal is not generated for the corresponding region.

(a) and (b) of FIG. 7 is a conceptual view illustrating various shapes of the conductive members 261 and 262.

The conductive members 261 and 262 may be arranged in a predetermined shape on the inner surfaces of the bodies 210 and 220 along the extending directions of the bodies 210 and 220.

For example, the first conductive member 261 disposed on the inner surface of the first body 210 may be installed along the extending direction of the first body 210, and the second conductive member 262 disposed on the inner surface of the second body 220 may be installed along the extending direction of the second body 220.

In this case, the conductive members 261 and 262 may be arranged in parallel with each other at a predetermined interval or may be arranged in a concave-convex shape.

Accordingly, the first conductive member 261 disposed in the first body 210 may receive a touch input signal applied to at least one first touch channel X1 to Xn, and thus may define the first touch recognition region 231.

In addition, the second conductive member 262 disposed in the second body 220 may receive a touch input signal applied to another first touch channel X1 to Xn located at a position different from a position in contact with the first conductive member 261, and thus define the second touch recognition region 232.

The conductive member 260 may be made of any one of rubber which is a conductive rubber material or metal.

FIG. 8 is a cross-sectional view illustrating a flexible display device in accordance with another implementation.

As illustrated in FIG. 8, magnets 271 and 272 having different polarities may be disposed at one side of the first body 210 and one side of the second body 220, respectively.

When the first body 210 and the second body 220 are in close contact with each other to be in the first state in which an exposure area of the flexible display unit is minimized, the first magnet 271 and the second magnet 272 may be located to be adjacent to each other, so as to apply supporting force for maintaining the close-contact state between the first body 210 and the second body 220.

That is, when the flexible display unit 230 is rolled into the body part so that the first body 210 and the second body 220 are located adjacent to each other, the first magnet 271 and the second magnet 272 may become adjacent to each other so as to apply magnetic force due to magnetism.

FIG. 9 is a lateral view illustrating a flexible display device 300 in accordance with still another implementation. FIGS. 10A and 10B are conceptual views illustrating a state when a conductive member 361 applies an input signal to a flexible display unit 330 in the flexible display device 300 of FIG. 9.

Since the basic structure and operation of the flexible display device 300 according to this implementation are the same as those of the flexible display device of FIGS. 2 to 8 described above, a description thereof will be omitted within the duplicated range.

The flexible display device 300 may include a body part 310, 320, and a flexible display unit 330 that can be inserted into or drawn out of the body part 310, 320. The flexible display device 300 may further include a rear plate 340 that supports the flexible display unit 330 and is rolled or unrolled together with the flexible display unit 330.

As illustrated in FIG. 9, the body part 310, 320 may include a first body 310 including a rotary member 350 on which the flexible display unit 330 is rolled, and a second body 320 supporting one end portion of the flexible display unit 330 and gripped by the user.

The flexible display device 300 may implement a first state in which the first body 310 and the second body 320 are in close contact with each other such that an exposed region of the flexible display unit 330 is limited, and a second state in which the first body 310 and the second body 320 are spaced apart from each other by a predetermined interval such that one region of the flexible display unit 330 is exposed between the first body 310 and the second body 320.

However, unlike the flexible display device 200 of FIGS. 2 to 8, this implementation illustrates a structure in which the flexible display unit 330 rolled by the rotary member 350 is located only in the first body 310.

The flexible display unit 330 may transmit to the controller (not illustrated) an input signal generated by interaction with a first conductive member 361 disposed on one end portion of an inner surface of the first body 310 and a second conductive member (not illustrated) disposed inside the second body 320.

The controller (not illustrated) may set an exposed region of the flexible display unit 330 to an active region based on the input signal received through the flexible display unit 330. In addition to this, the controller (not illustrated) may set a non-exposed region of the flexible display unit 330 rolled in the first body 310 to an inactive region.

Specifically, when at least a portion of the flexible display unit 330 is and deformed to be rollable on the rotary member 350 while being inserted into the first body 210, the controller (not illustrated) may set an externally-exposed region of the flexible display unit 330 to an active region, based on touch inputs applied by the first conductive member 361 and the second conductive member.

At this time, as previously described in FIGS. 5A and 5B, the flexible display unit 330 may include a touch sensing layer 330a that includes a plurality of touch channels X1 to Xn and Y1 to Yn arranged at predetermined intervals to receive touch inputs.

The touch sensing layer 330a may include a first sensing layer including first touch channels X1 to Xn extending in a first direction, and a second sensing layer including second touch channels Y1 to Yn extending in a second direction intersecting with the first direction.

As illustrated in FIG. 10A, in a state in which one region of the flexible display unit 330 between the first body 310 and the second body 320 is exposed to outside, touch inputs may be applied to different regions of the touch sensing layer 330a by the first conductive member 361 disposed in the second body 310 and the second conductive member disposed in the second body 320.

Specifically, the first conductive member 361 disposed in the first body 310 may apply a touch input signal of at least one first touch channel X1 to Xn, and may define a first touch recognition region 331.

In addition, the second conductive member disposed in the second body 320 may apply a touch input signal of another first touch channel X1 to Xn located at a position different from a position in contact with the first conductive member 361, and define a second touch recognition region 332.

However, since this implementation illustrates the structure in which the flexible display unit 330 is rolled only into the first body 310, the second touch recognition region 332 may be fixed to a specific position.

The controller (not illustrated) may set a region between the first touch recognition region 331 and the second touch recognition region 332 to an active region. At this time, the controller may set the region to a region to which a signal for outputting screen information is transmitted or a touch input is applied.

Also, the controller (not illustrated) may set another region of the flexible display unit 230 to an inactive region based on position information of touch channels in contact with the conductive members.

For example, the controller (not illustrated) may set a region between the first touch recognition region 331 and the second touch recognition region 332 to the active region, and may simultaneously set an outer region of the first touch recognition region 331 to an inactive region such that any signal is not generated for the corresponding region.

FIG. 11 is a flowchart illustrating a method for controlling a flexible display device 200, 300 in accordance with the present disclosure.

As described above, the flexible display unit 230, 330 may be rolled into the first body 210, 310 and the second body 220, 320 constituting the body part, and an externally-exposed region of the flexible display unit 230, 330 may change in response to mutual movement of the first body 210, 310 and the second body 220, 320.

In addition, in the flexible display device 200, 300, the flexible display unit 230, 330 may implement the first state in which the flexible display unit 230, 330 is rolled in the first body 210 and the second body 220, and the second state in which at least a portion of the flexible display unit 230 is unrolled by being drawn out of the first body 210 and the second body 220.

In this case, the controller (not illustrated) may set the exposed region of the flexible display unit 230, 330 to the active region based on an input signal received through the flexible display unit 230, 230. The controller (not illustrated) may also set a non-exposed region of the flexible display unit 230, 230 located inside the first body 210, 310 and/or the second body 220 to an inactive region.

Specifically, when at least a portion of the flexible display unit 230, 230 is deformed to be rollable on the rotary members 250, 350 while being inserted into the first body 210, 310 and/or the second body 220, 320, the controller (not illustrated) may set an externally-exposed region of the flexible display unit 230, 330 to an active region, based on touch inputs applied by the first conductive member 261, 361 and the second conductive member 262, 362.

Hereinafter, a method for controlling the flexible display device 200, 300 by the controller (not illustrated) will be described. The controller may perform a first step of setting an exposed region of the flexible display unit 230, 330, which is unrolled from the body part or rolled into the body part while being deformed by external force, to an active region.

Here, the first step may include setting by the controller an externally-exposed region of the flexible display unit to the active region based on a touch input (input signal) that is generated in response to a contact between the flexible display unit and the conductive member disposed inside the body part.

In addition, the controller may control the flexible display device 200, 300 in sequence of a second step of setting an exposed region of the flexible display unit 230, 330 to a new active region by detecting a change in the active region, and a third step of setting a region of the flexible display unit located inside the body part to an inactive region. In this case, the controller may perform the second step and the third step at the same time or at different times, and may also perform the second step and the third step in a reverse order.

The aforementioned flexible display devices are not limited to the configurations and the methods of the embodiments described above, but all or some of the embodiments may be selectively combined so that various modifications can be made.

INDUSTRIAL AVAILABILITY

The present disclosure can be variously implemented in an industrial field using devices that use flexible displays.

The invention claimed is:

1. A flexible display device comprising:
a body part having a polygonal column shape;
a flexible display unit configured to be deformed by an external force so as to be inserted into or drawn out of the body part;
a rotary member rotatably installed inside the body part and configured to roll or unroll the flexible display unit along an outer surface thereof;
conductive members fixed to a bottom surface inside the body part and configured to apply touch inputs, in response to being in contact with the flexible display unit; and
a controller configured to set an externally-exposed region of the flexible display unit to an active region based on the touch inputs applied to the flexible display unit,
wherein the body part comprises a first body and a second body disposed to face the first body,
wherein the conductive member includes a first conductive member disposed on a bottom surface inside the first body and a second conductive member disposed on a bottom surface inside the second body, and
wherein the controller sets the externally-exposed region of the flexible display unit to the active region based on a signal generated by touch inputs of the first conductive member and the second conductive member.

2. The flexible display device of claim 1, wherein the flexible display unit is unrolled from the rotary member to increase the externally-exposed region and is rolled on the rotary member to decrease the externally-exposed region.

3. The flexible display device of claim 2, wherein the controller sets the externally-exposed region to the active region and a non-exposed region of the flexible display unit located inside the body part to an inactive region.

4. The flexible display device of claim 3, wherein the flexible display unit comprises a touch sensing layer having a plurality of touch channels arranged at predetermined intervals to receive the touch inputs, and
wherein the plurality of touch channels transmit signals, respectively, for setting the active region to the controller, in response to being in contact with the conductive members according to a change in the externally-exposed region of the flexible display unit.

5. The flexible display device of claim 4, wherein the controller sets the non-exposed region of the flexible display unit to the inactive region, based on position information related to the plurality of touch channels in contact with the conductive members.

6. The flexible display device of claim 4, wherein the controller sets the non-exposed region of the flexible display unit located inside the body part to the inactive region, based on the plurality of touch channels in contact with the conductive members.

7. The flexible display device of claim 1, wherein the controller controls screen information to be displayed on the active region.

8. The flexible display device of claim 1, wherein the controller controls a touch input to be detected on the active region.

9. The flexible display device of claim 1, wherein the conductive members are disposed in a predetermined shape on an inner surface of the body part, along an extending direction of the body part.

10. The flexible display device of claim 9, wherein the conductive members are made of any one of conductive rubber and metal.

11. The flexible display device of claim 10, wherein the conductive members are disposed in parallel at a predetermined interval.

12. The flexible display device of claim 1, wherein the body part further comprises:
a main cover member having a polygonal column shape with both ends open and defining an inner storage space; and
side cover members configured to cover the both ends of the main cover member.

13. The flexible display device of claim 12, wherein the externally-exposed region of the flexible display unit is changed as a distance between the first body and the second body changes according to an unrolled state of the flexible display unit.

14. The flexible display device of claim 13, wherein the conductive members are fixed to the bottom surfaces inside the first body and the second body, respectively, to apply the touch inputs when being in contact with the flexible display unit, and
wherein the controller sets the externally-exposed region of the flexible display unit to the active region based on signals generated by the touch inputs.

15. The flexible display device of claim 1, further comprising a rear plate coupled to a rear surface of the flexible display unit to be deformed together with the flexible display unit.

16. The flexible display device of claim 15, wherein a front portion of the rear plate is closely coupled to a rear portion of the flexible display unit, and one side of a rear portion of the rear plate is rolled along the outer surface of the rotary member.

17. The flexible display device of claim 13, wherein a first magnet is disposed on an outer surface of the first body,
wherein a second magnet is disposed on an outer surface of the second body to face the first magnet, and
wherein the first magnet and the second magnet get adjacent to each other and interact with each other such that the first body and the second body are in close contact with each other, when the externally-exposed region of the flexible display unit is minimized.

18. A method for controlling a flexible display device including a controller, the method comprising:
a first step of setting an externally-exposed region of a flexible display unit to an active region, the flexible display unit being deformed by an external force to be drawn out of or inserted into a body part;
a second step of setting the externally-exposed region of the flexible display unit to a new active region by detecting a change in the active region; and
a third step of setting a region of the flexible display unit inserted into the body part to an inactive region,
wherein the body part comprises a first body and a second body disposed to face the first body,
wherein a conductive member includes a first conductive member disposed on a bottom surface inside the first body and a second conductive member disposed on a bottom surface inside the second body, and
wherein the controller sets the externally-exposed region of the flexible display unit to the active region based on a signal generated by touch inputs of the first conductive member and the second conductive member.

* * * * *